(12) United States Patent
Cardenas

(10) Patent No.: US 12,543,703 B1
(45) Date of Patent: Feb. 10, 2026

(54) WILDLIFE FEEDER

(71) Applicant: James Cardenas, San Antonio, TX (US)

(72) Inventor: James Cardenas, San Antonio, TX (US)

( * ) Notice: Subject to any disclaimer, the term of this patent is extended or adjusted under 35 U.S.C. 154(b) by 113 days.

(21) Appl. No.: 18/381,985

(22) Filed: Oct. 19, 2023

Related U.S. Application Data

(60) Provisional application No. 63/417,491, filed on Oct. 19, 2022.

(51) Int. Cl.
*A01K 5/02* (2006.01)
*A01M 29/30* (2011.01)

(52) U.S. Cl.
CPC .............. *A01K 5/0225* (2013.01); *A01K 5/02* (2013.01); *A01M 29/30* (2013.01)

(58) Field of Classification Search
CPC .............. A01K 5/0142; A01K 39/0113; A01K 5/0225; A01M 29/30
See application file for complete search history.

(56) References Cited

U.S. PATENT DOCUMENTS

| | | | | |
|---|---|---|---|---|
| 2,896,575 A | * | 7/1959 | Scruggs | A01K 39/0113 D30/128 |
| 4,867,104 A | * | 9/1989 | Vandiver | A01K 39/0113 119/52.3 |
| 5,676,089 A | * | 10/1997 | Morganson | A01K 39/0113 119/52.3 |
| 6,192,832 B1 | * | 2/2001 | Husnik | A01K 39/0113 119/52.3 |
| 11,083,187 B1 | * | 8/2021 | McCoy | A01K 5/0225 |

* cited by examiner

*Primary Examiner* — Kimberly S Berona
*Assistant Examiner* — Steven J Shur
(74) *Attorney, Agent, or Firm* — Taboada Law Firm, PLLC; John M. Taboada

(57) ABSTRACT

Methods and apparatuses for protecting feed accumulated in feed troughs of a gravitationally fed, passive wildlife feeder are disclosed, including providing an apparatus comprising: a body, the body having an adapter configured to fit over a feed trough of the gravitationally fed, passive wildlife feeder; a plurality of pointed plates coupled to the body; arms attached to the body; and a first rotation member and a second rotation member rotatably supported to the body by the arms; wherein the plurality of pointed plates are configured to prevent unwanted wildlife from jumping onto the apparatus, and wherein the first rotation member and the second rotation member are configured to prevent the unwanted wildlife from grabbing onto the apparatus to access the feed; and if the apparatus has not been loaded with feed, then dispensing feed into the apparatus. Other embodiments are described and claimed.

19 Claims, 15 Drawing Sheets

Provide an apparatus for protecting feed accumulated in the feed troughs of a gravitationally fed, passive wildlife feeder comprising a feed hopper, a plurality of supports coupled to the feed hopper, and one or more feed troughs coupled to the feed hopper and configured to receive a flow of feed from the hopper caused by gravity, wherein the supports are configured to position the one or more feed troughs at approximately the muzzle height of the desired wildlife to be fed and wherein each of the one or more feed troughs comprises a plurality a feed hopper, a plurality of supports coupled to the feed hopper, and one or more feed troughs coupled to the feed hopper and configured to receive a flow of feed from the hopper caused by gravity, wherein the supports are configured to position the one or more feed troughs at approximately the muzzle height of the desired wildlife to be fed and wherein each of the one or more feed troughs comprises a plurality of pointed plates configured to prevent unwanted wildlife from jumping onto the one or more feed troughs and reaching into the feed access opening of the feed trough, and a first rotation member and a second rotation member rotatably supported to the feed trough by arms and configured to prevent unwanted wildlife from grabbing onto the one or more feed troughs to access the feed. In some embodiments, the one or more feed troughs further comprise a gabled cover member that is attached to the top side of the feed troughs and configured to prevent unwanted wildlife from accessing the feed in the feed trough from above. In some embodiments, the one or more feed troughs further comprises a bottom plate having an angle such that the edge of the bottom plate closest to the first rotation member is higher than the edge furthest from the first rotation member in order to prevent the feed from flowing through the feed access opening and out of the feed trough. In some embodiments, the second rotation member comprises two or more independently rotatable coaxial rollers. In some embodiments, the apparatus for protecting feed accumulated in the feed troughs of the wildlife feeder further comprises a lid configured to cover the upper opening of the hopper in order to protect the feed within the apparatus from wildlife and the elements. In some embodiments, each of the one or more feed troughs further comprises a bottom plate having one or more perforations which permit the drainage of fluids such as rain and wildlife saliva from the feed. In some embodiments, the apparatus further comprises coverings surrounding each of the plurality of supports. The coverings comprise a material, such as PVC, with less friction than a painted or powder coated steel from which the rest of the apparatus may be constructed. In some embodiments, the apparatus further comprises arms, which support the first rotation member and second rotation member, having a saw tooth edge.
1000

If the apparatus had not been loaded with feed, dispense feed into the hopper in order to fill the one or more feed troughs with feed.
1005

Intended wildlife can now feed from the apparatus while unintended wildlife are not capable of accessing the feed.
1010

*Fig. 10*

WILDLIFE FEEDER

I. CROSS REFERENCE TO RELATED APPLICATIONS

This application claims the benefit of the filing date of U.S. Provisional Patent Application Ser. No. 63/417,491, filed on Oct. 19, 2023, entitled "Wildlife Feeder," the entire disclosure of which is hereby incorporated by reference into the present disclosure.

II. BACKGROUND

The present invention relates generally to the field of wildlife feeders. More particularly, the invention relates to a wildlife feeder comprising an apparatus for protecting feed accumulated in the feed troughs of the wildlife feeder from unintended wildlife.

III. SUMMARY

In one respect, disclosed is an apparatus for protecting feed accumulated in feed troughs of a gravitationally fed, passive wildlife feeder comprising: a body, the body having an adapter configured to fit over a feed trough of the gravitationally fed, passive wildlife feeder; a plurality of pointed plates coupled to the body; arms attached to the body; and a first rotation member and a second rotation member rotatably supported to the body by the arms; wherein the plurality of pointed plates are configured to prevent unwanted wildlife from jumping onto the apparatus, and wherein the first rotation member and the second rotation member are configured to prevent the unwanted wildlife from grabbing onto the apparatus to access the feed.

In another respect, disclosed is a gravitationally fed, passive wildlife feeder comprising: a feed hopper, the feed hopper configured to hold feed; a plurality of supports coupled to the feed hopper; and one or more feed troughs coupled to the feed hopper, wherein the one or more feed troughs are configured to receive the feed from the feed hopper; the one or more feed troughs comprising: a body; a plurality of pointed plates coupled to the body; arms attached to the body; and a first rotation member and a second rotation member rotatably supported to the body by the arms; wherein the plurality of supports are configured to position the one or more feed troughs at approximately a muzzle height of desired wildlife to be fed, wherein the plurality of pointed plates are configured to prevent unwanted wildlife from jumping onto the apparatus, and wherein the first rotation member and the second rotation member are configured to prevent the unwanted wildlife from grabbing onto the apparatus to access the feed.

In yet another respect, disclosed is a method for protecting feed accumulated in feed troughs of a gravitationally fed, passive wildlife feeder, comprising: providing an apparatus comprising: a body, the body having an adapter configured to fit over a feed trough of the gravitationally fed, passive wildlife feeder; a plurality of pointed plates coupled to the body; arms attached to the body; and a first rotation member and a second rotation member rotatably supported to the body by the arms; wherein the plurality of pointed plates are configured to prevent unwanted wildlife from jumping onto the apparatus, and wherein the first rotation member and the second rotation member are configured to prevent the unwanted wildlife from grabbing onto the apparatus to access the feed; and if the apparatus has not been loaded with feed, then dispensing feed into the apparatus.

Numerous additional embodiments are also possible.

IV. BRIEF DESCRIPTION OF THE DRAWINGS

Other objects and advantages of the invention may become apparent upon reading the detailed description and upon reference to the accompanying drawings.

FIG. 10 is a block diagram illustrating a method for protecting feed accumulated in the feed troughs of a gravitationally fed, passive wildlife feeder, in accordance with some embodiments.

Figure 1:
FIG. 1 is a game camera photo showing raccoons gripping onto the chutes of a gravitationally fed, passive wildlife feeder.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Figure 2:
FIG. 2 is a game camera photo showing a group of raccoons feeding from a gravitationally fed, passive wildlife feeder.

Gravitationally fed, passive wildlife feeders provide feed to wildlife. Certain feeders are designed to provide feed for deer, elk, and other large game. Unfortunately, though, other wildlife, such as raccoons, help themselves to these unattended feed troughs and often times take over the entire wildlife feeders to the detriment of the intended wildlife. Many inventions have tried to address this problem, but they have not been successful. For example, a recent, U.S. Pat. No. 9,554,555 issued to Rick Meritt Investments, Ltd., addresses the problem by utilizing upper and lower extension members attached near the food opening to prevent critters that climb onto the feed dispensing tubes from getting to the feed. The problem with the Rick Meritt Investments apparatus, and that of other similar solutions, is that they do not address the issue of animals using the retaining member, or lip, which prevents the feed from flowing out of the opening and onto the ground, as a support grip for gaining access to the feed. Raccoons are more than capable of reaching up to passive wildlife feeders to gain access to the feed. FIG. 1 shows a raccoon grabbing onto the lip of a feed trough and another raccoon feeding from the passive wildlife feeder and FIG. 2 shows a group of raccoons feeding from the passive wildlife feeder.

A need exists for a method and apparatus for protecting feed accumulated in the feed troughs of gravitationally fed, passive wildlife feeders. The embodiment or embodiments described herein solve these problems and others by proposing a new method and apparatus which prevents unwanted wildlife from gaining access to the feed.

Figure 3:
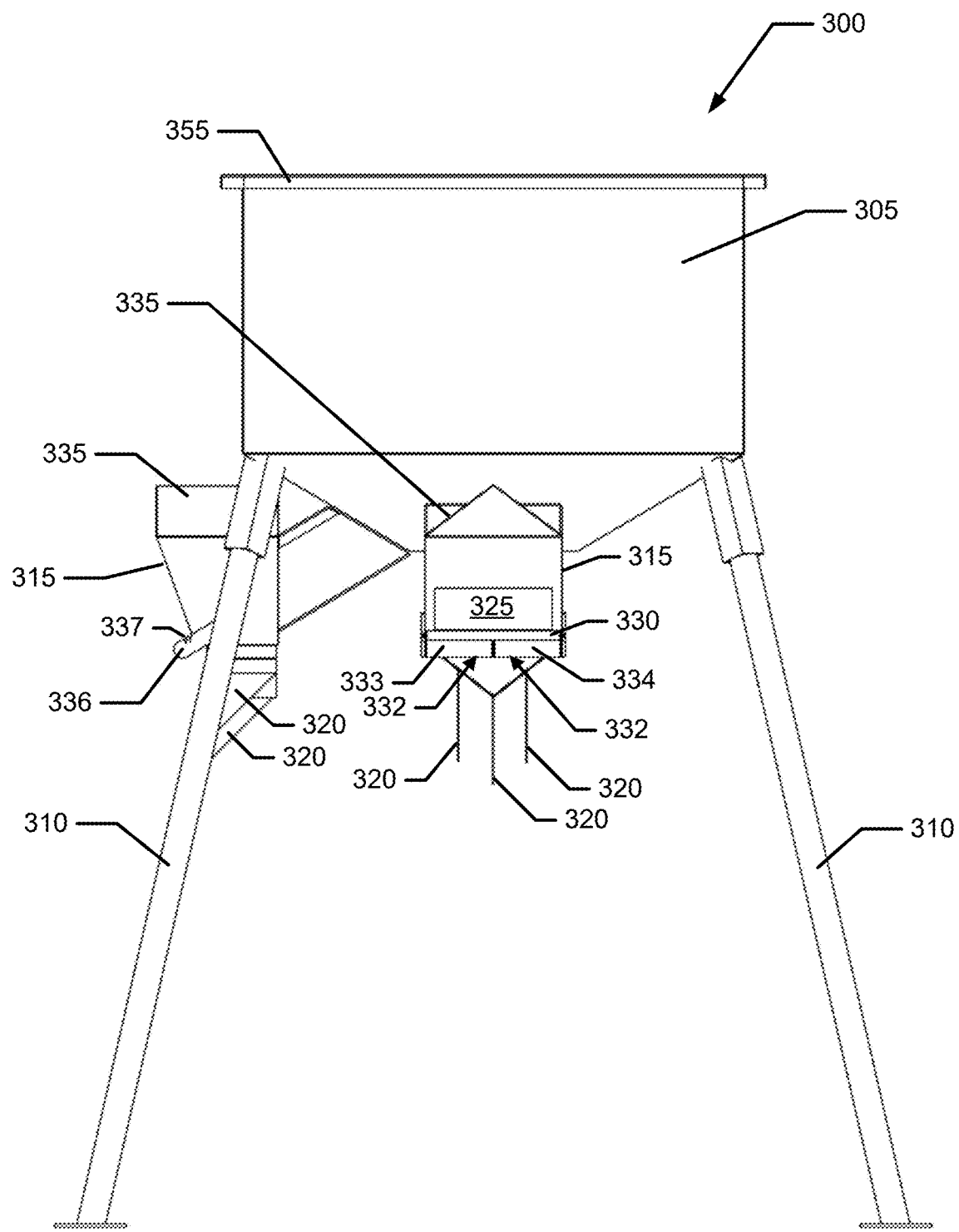
FIG. 3 is a side view schematic illustration of a gravitationally fed, passive wildlife feeder, in accordance with some embodiments.

FIG. 3 is a side view schematic illustration of a gravitationally fed, passive wildlife feeder, in accordance with some embodiments.

Figure 4:
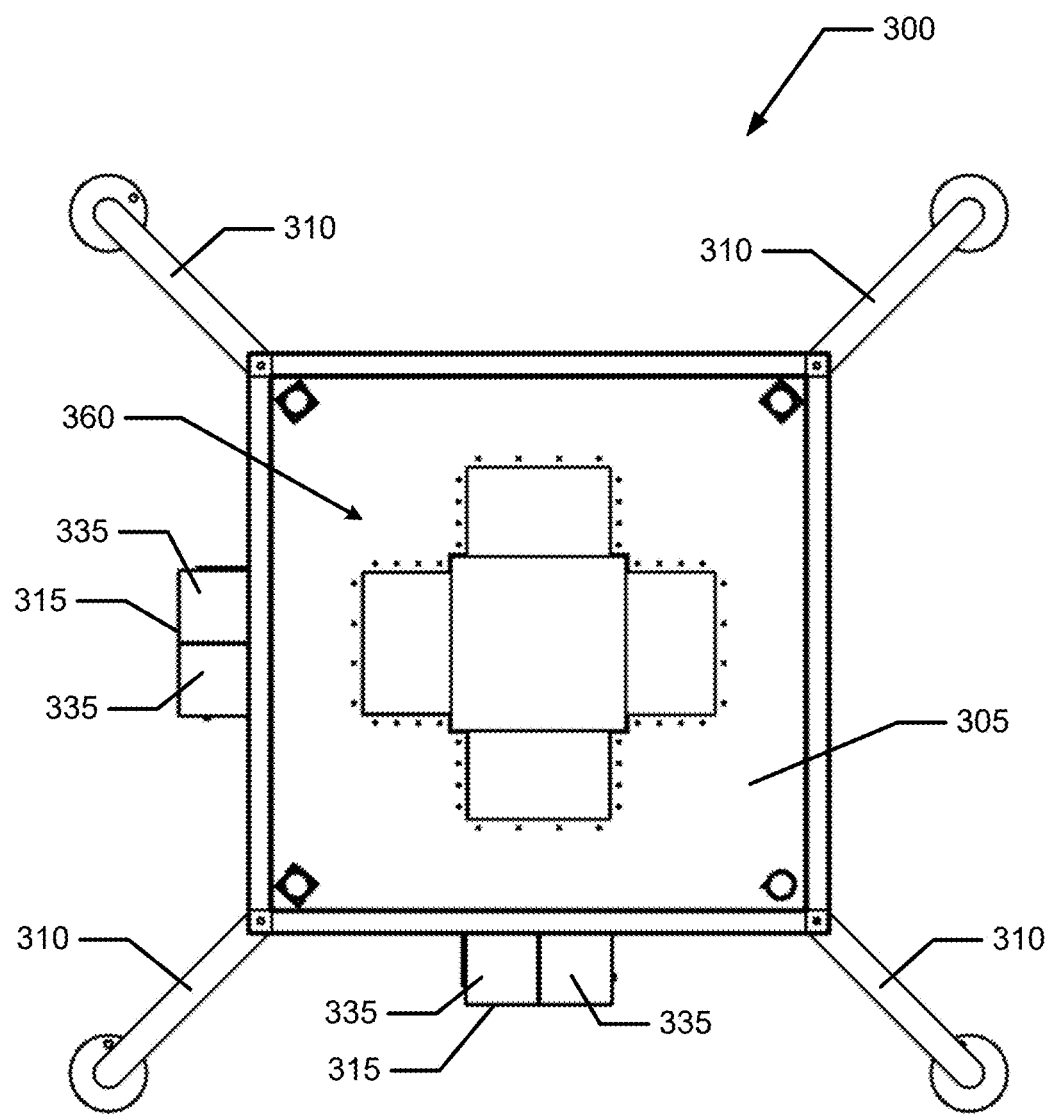
FIG. 4 is a top view schematic illustration of the gravitationally fed, passive wildlife feeder of FIG. 3 without the lid, in accordance with some embodiments.

FIG. 4 is a top view schematic illustration of the gravitationally fed, passive wildlife feeder of FIG. 3 without the lid, in accordance with some embodiments.

Figure 5:
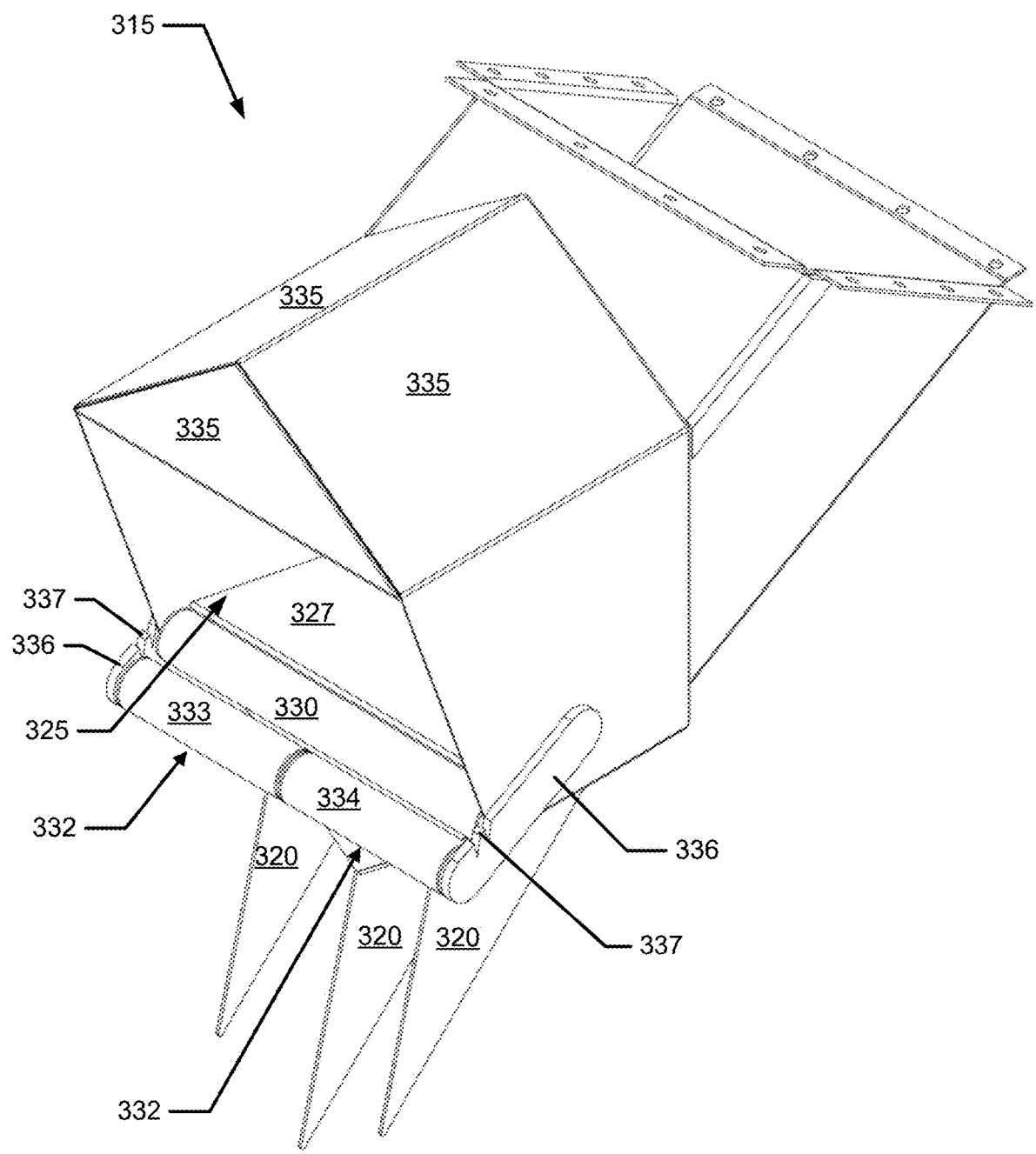
FIG. 5 is a perspective view of a feed trough of the gravitationally fed, passive wildlife feeder of FIG. 3, in accordance with some embodiments.

FIG. 5 is a perspective view of a feed trough of the gravitationally fed, passive wildlife feeder of FIG. 3, in accordance with some embodiments.

Figure 6:
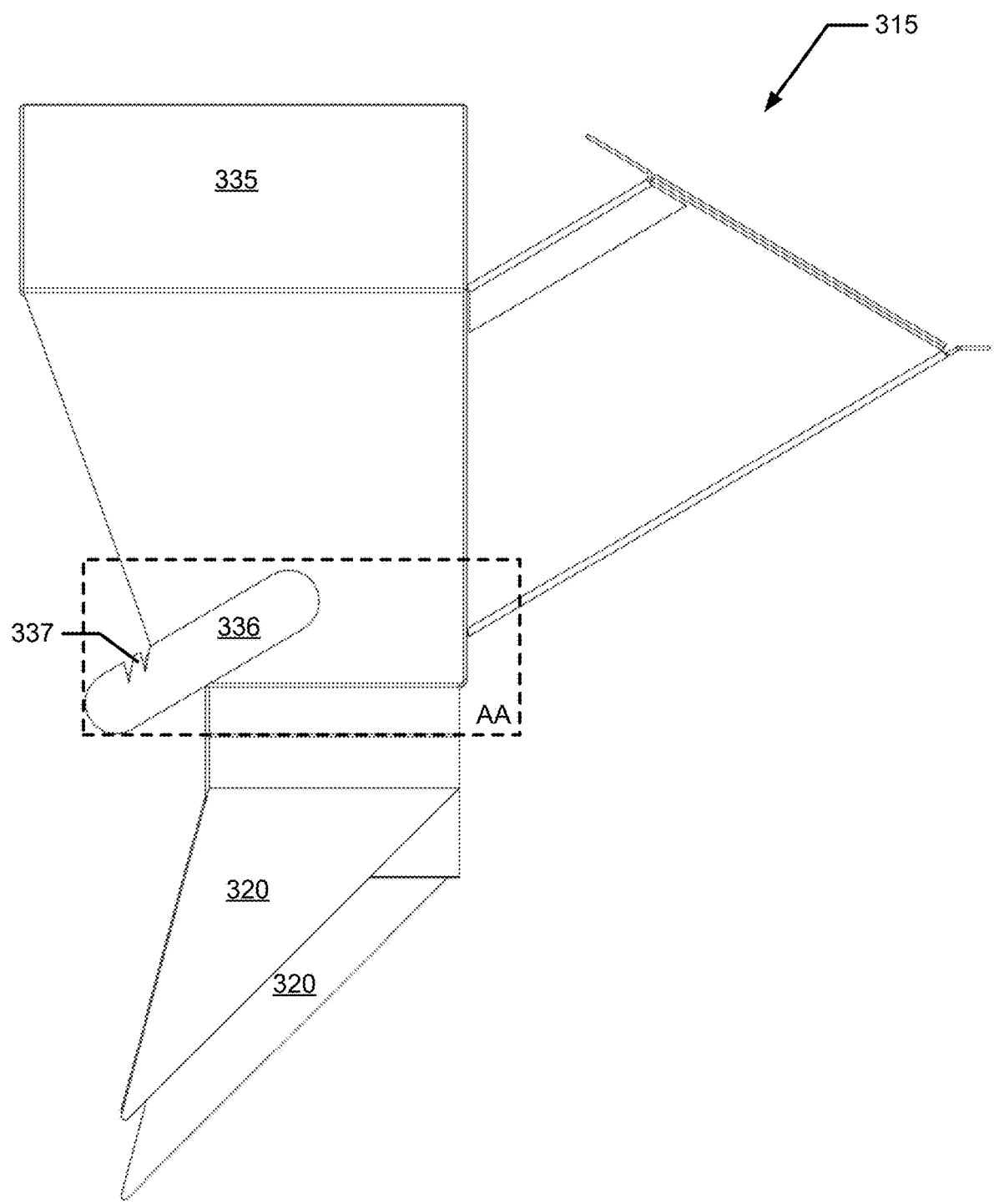
FIG. 6 is a side view of the feed trough of FIG. 5, in accordance with some embodiments.

FIG. 6 is a side view of the feed trough of FIG. 5, in accordance with some embodiments.

Figure 7:
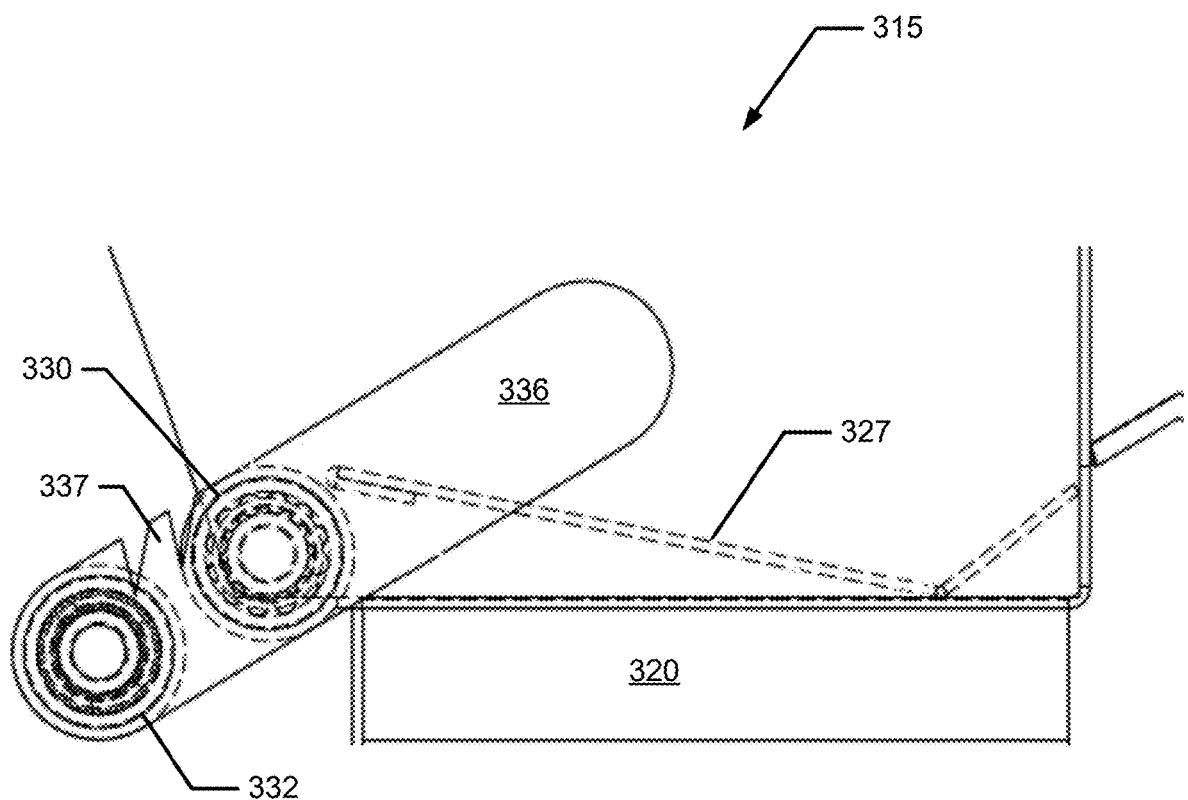
FIG. 7 is a transparent side view of the feed trough within dashed line rectangle AA of FIG. 6, passive wildlife feeder, in accordance with some embodiments.

FIG. 7 is a transparent side view of the feed trough within dashed line rectangle AA of FIG. 6, passive wildlife feeder, in accordance with some embodiments.

Figure 8:
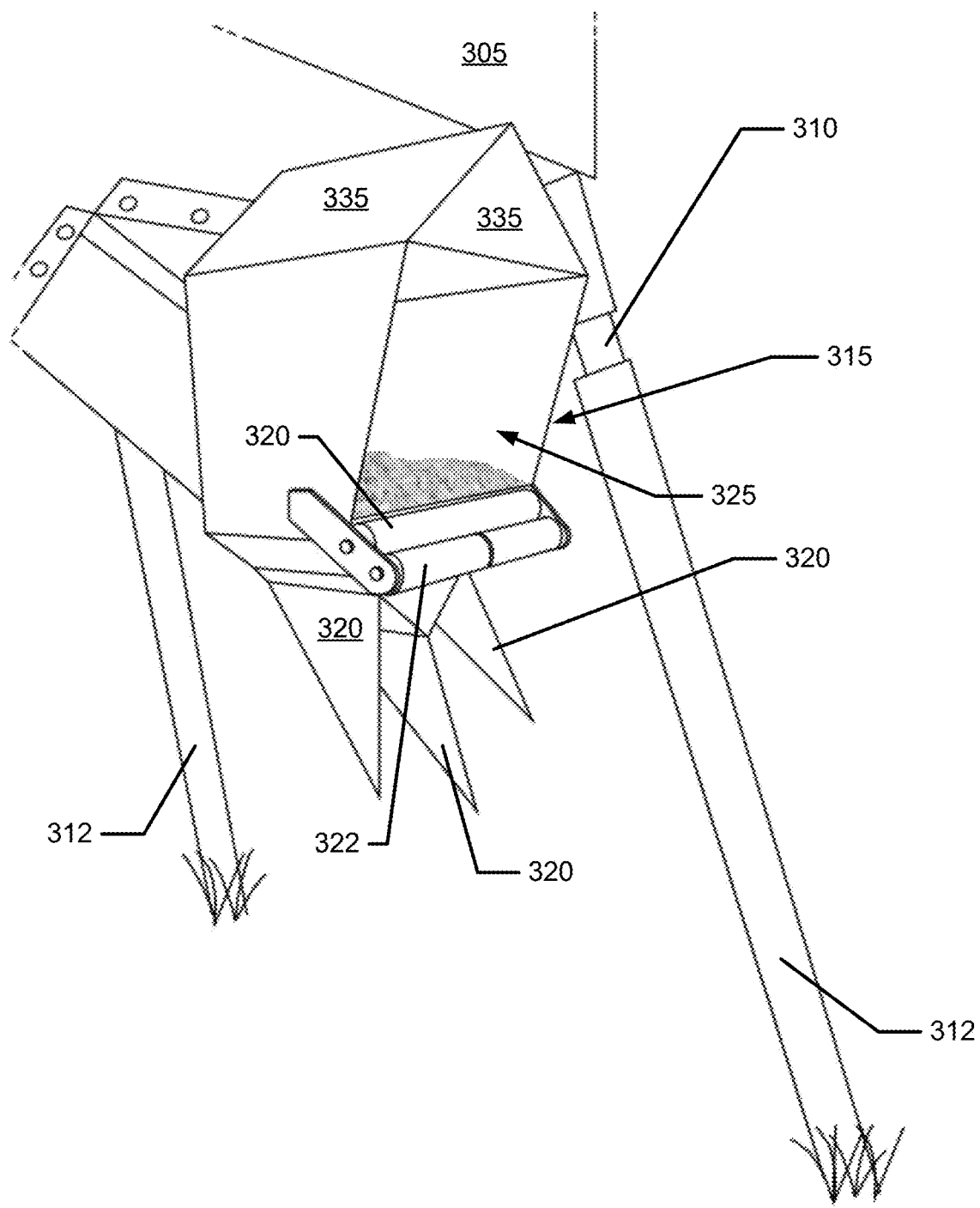
FIG. 8 is a perspective view photograph of a feed trough of a gravitationally fed, passive wildlife feeder, in accordance with some embodiments.

FIG. 8 is a perspective view photograph of a feed trough of a gravitationally fed, passive wildlife feeder, in accordance with some embodiments.

In some embodiments, the apparatus 300 for protecting feed accumulated in the feed troughs of a gravitationally fed, passive wildlife feeder comprises a feed hopper 305, a plurality of supports 310 coupled to the feed hopper, and one or more feed troughs 315 coupled to the feed hopper and configured to receive a flow of feed from the hopper caused by gravity, wherein the supports are configured to position the one or more feed troughs at approximately the muzzle height of the desired wildlife to be fed and wherein each of the one or more feed troughs comprises a plurality of pointed plates 320 configured to prevent unwanted wildlife from jumping onto the one or more feed troughs and reaching into the feed access opening 325 of the feed trough, and a first rotation member 330 and a second rotation member 332 rotatably supported to the feed trough by arms 336 and configured to prevent unwanted wildlife from grabbing onto the one or more feed troughs to access the feed. Since the rotation members are permitted to rotate, unwanted wildlife, such as raccoons, will not be able to successfully grab onto the feed trough because as the wildlife reaches up, they will first contact the rotation members and their grip will just roll off.

In some embodiments, the one or more feed troughs further comprise a gabled cover member 335 that is attached to the top side of the feed troughs and configured to prevent unwanted wildlife from accessing the feed in the feed trough from above.

In some embodiments, the one or more feed troughs 315 comprises a bottom plate 327 having an angle such that the edge of the bottom plate closest to the first rotation member 330 is higher than the edge furthest from the first rotation member in order to prevent the feed from flowing through the feed access opening 325 and out of the feed trough.

In some embodiments, the second rotation member 332 comprises two or more independently rotatable coaxial rollers, 333, 334. Independently rotatable coaxial rollers makes it more difficult for unwanted wildlife from grasping onto the feed trough.

In some embodiments, the apparatus 300 for protecting feed accumulated in the feed troughs of the wildlife feeder further comprises a lid 355 configured to cover the upper opening 360 of the hopper 305 in order to protect the feed within the apparatus from wildlife and the elements.

In some embodiments, each of the one or more feed troughs further comprises a bottom plate having one or more perforations which permit the drainage of fluids such as rain and wildlife saliva from the feed. Draining the fluids reduces the chances that the feed will rot.

In some embodiments, the apparatus 300 further comprises coverings 312 surrounding each of the plurality of supports 310. The coverings comprise a material, such as PVC, with less friction than a painted or powder coated steel from which the rest of the apparatus may be constructed. Having a material with less friction surrounding the plurality of supports makes it more difficult for unwanted wildlife to use the plurality of supports as climbing poles to access the feed.

In some embodiments, the apparatus 300 further comprises arms 336 having a saw tooth edge 337.

Figure 9A:
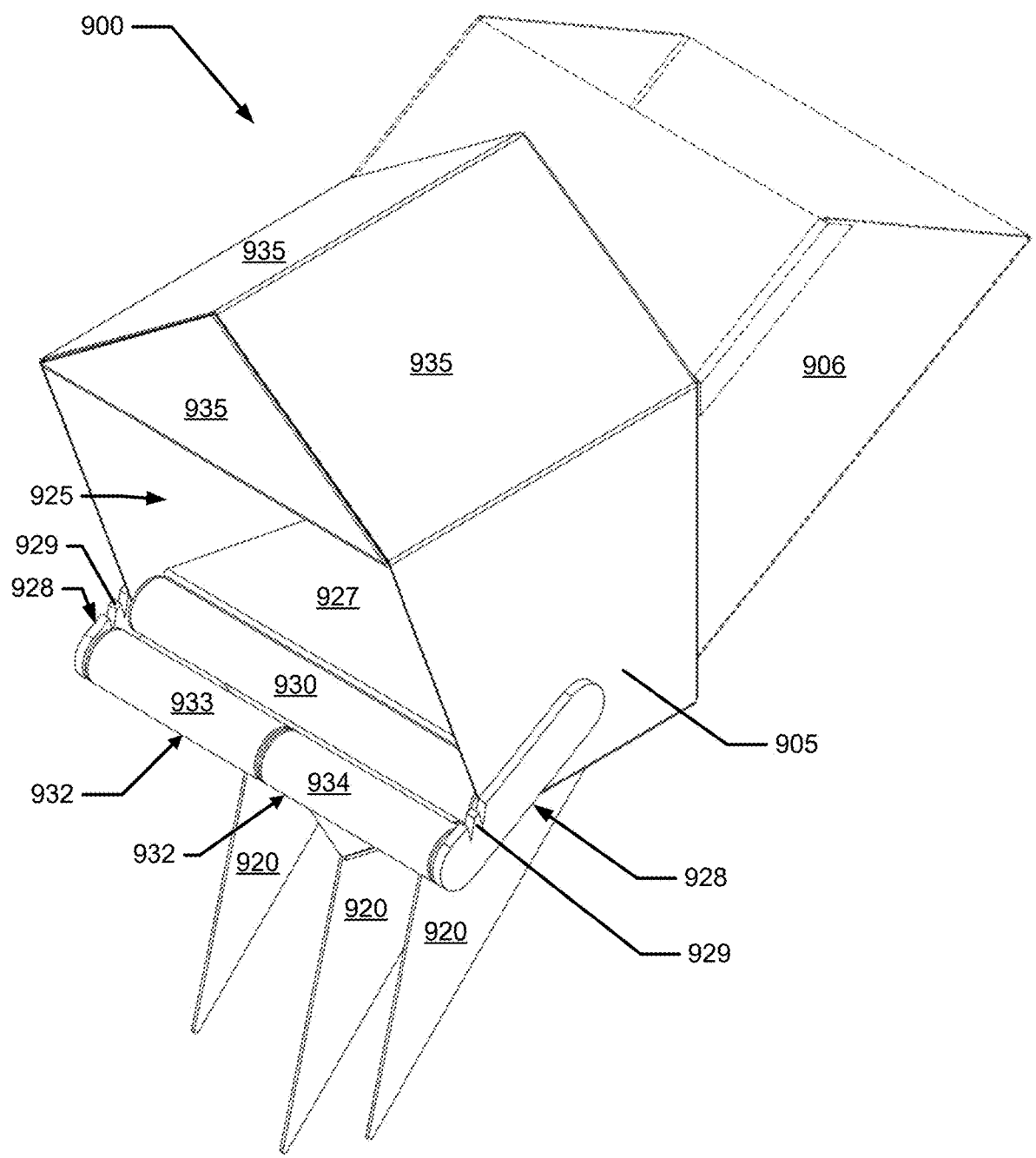
FIG. 9A is a perspective view of a feed trough adapter, in accordance with some embodiments.

FIG. 9A is a perspective view of a feed trough adapter, in accordance with some embodiments.

Figure 9B:
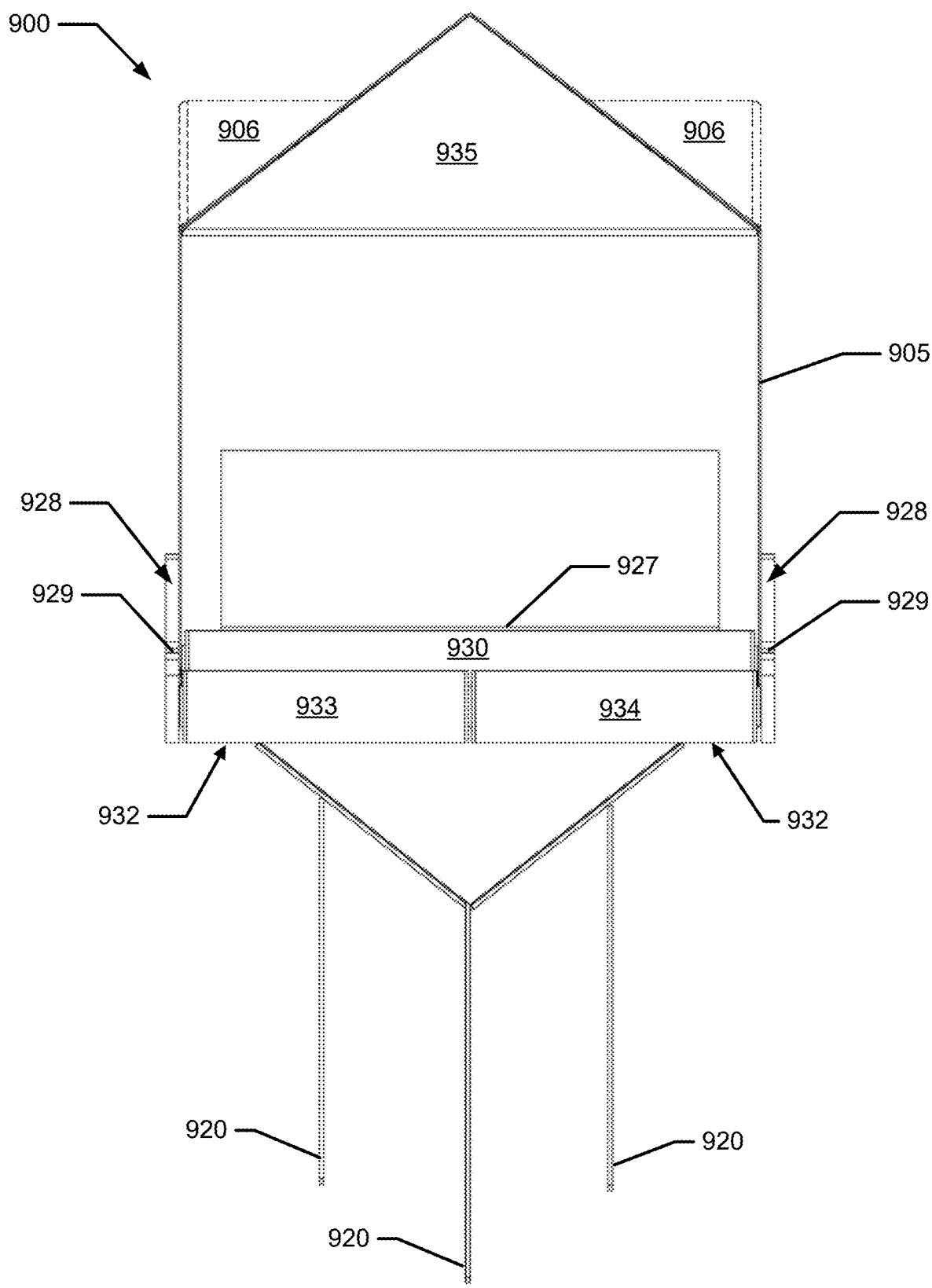
FIG. 9B is a front view of the feed trough adapter of FIG. 9A, in accordance with some embodiments.

FIG. 9B is a front view of the feed trough adapter of FIG. 9A, in accordance with some embodiments.

Figure 9C:
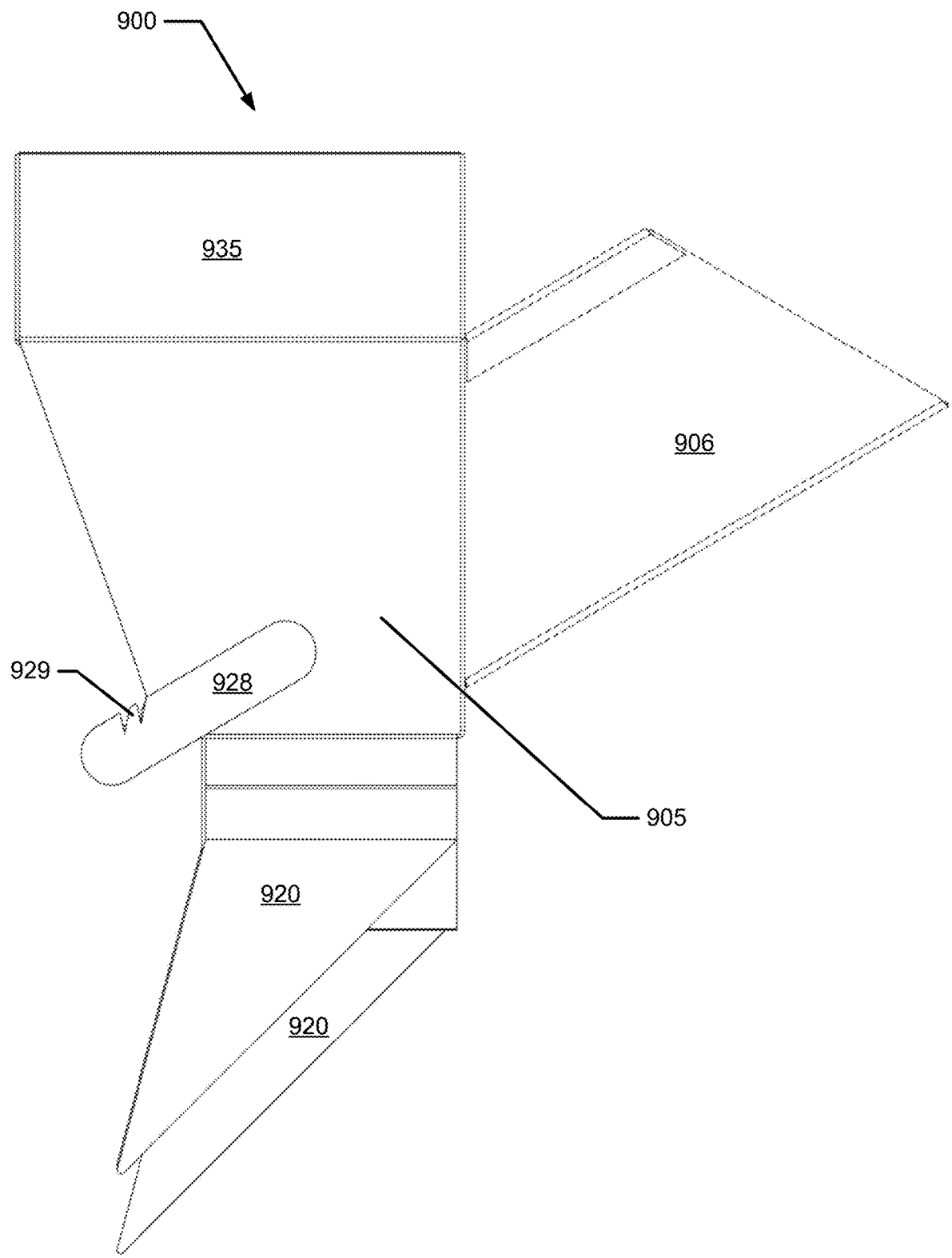
FIG. 9C is a right side view of the feed trough adapter of FIG. 9A, the left side view being a mirror image of FIG. 9C, in accordance with some embodiments.

FIG. 9C is a right side view of the feed trough adapter of FIG. 9A, the left side view being a mirror image of FIG. 9C, in accordance with some embodiments.

Figure 9D:
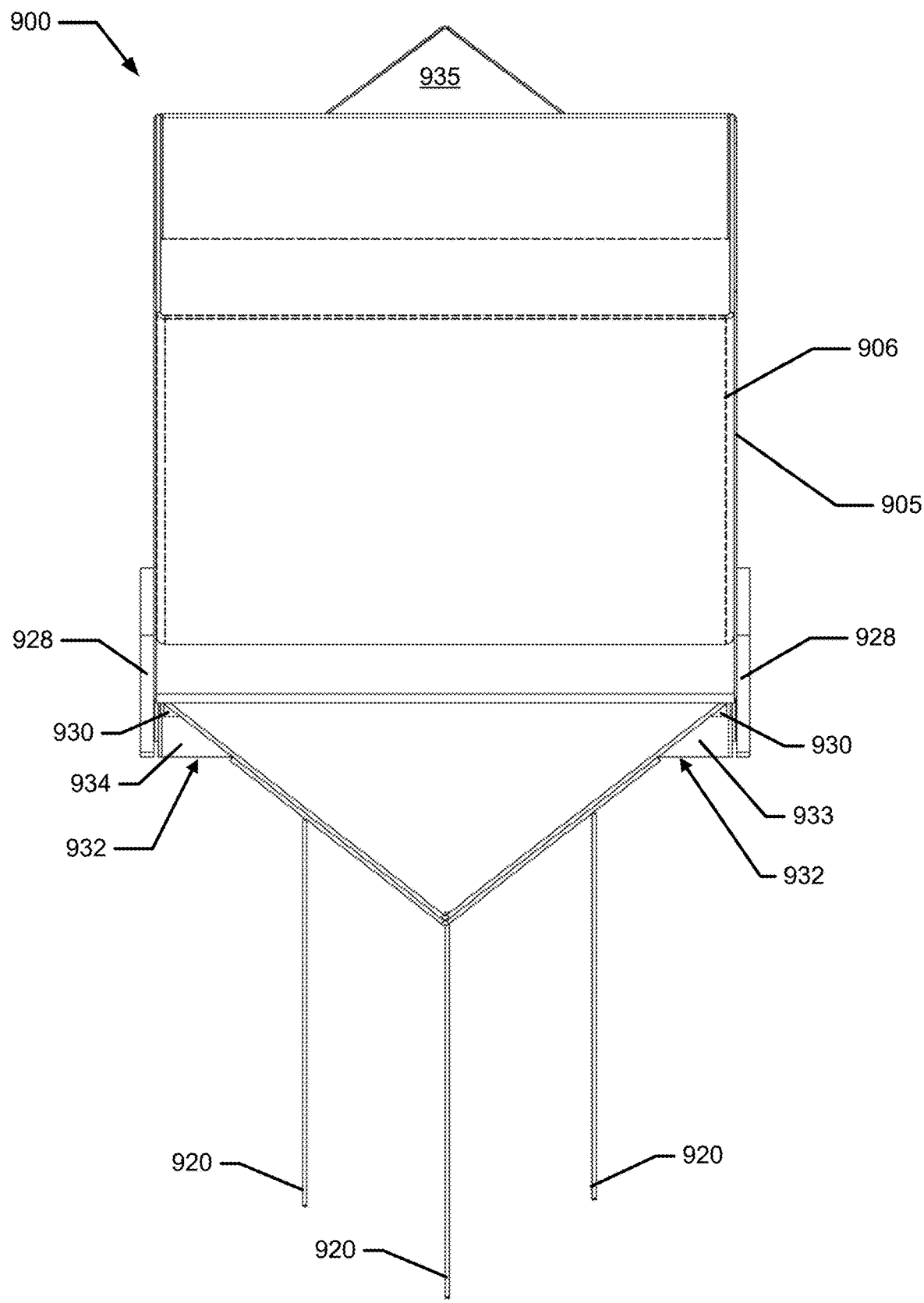
FIG. 9D is a back view of the feed trough adapter of FIG. 9A, in accordance with some embodiments.

FIG. 9D is a back view of the feed trough adapter of FIG. 9A, in accordance with some embodiments.

Figure 9E:
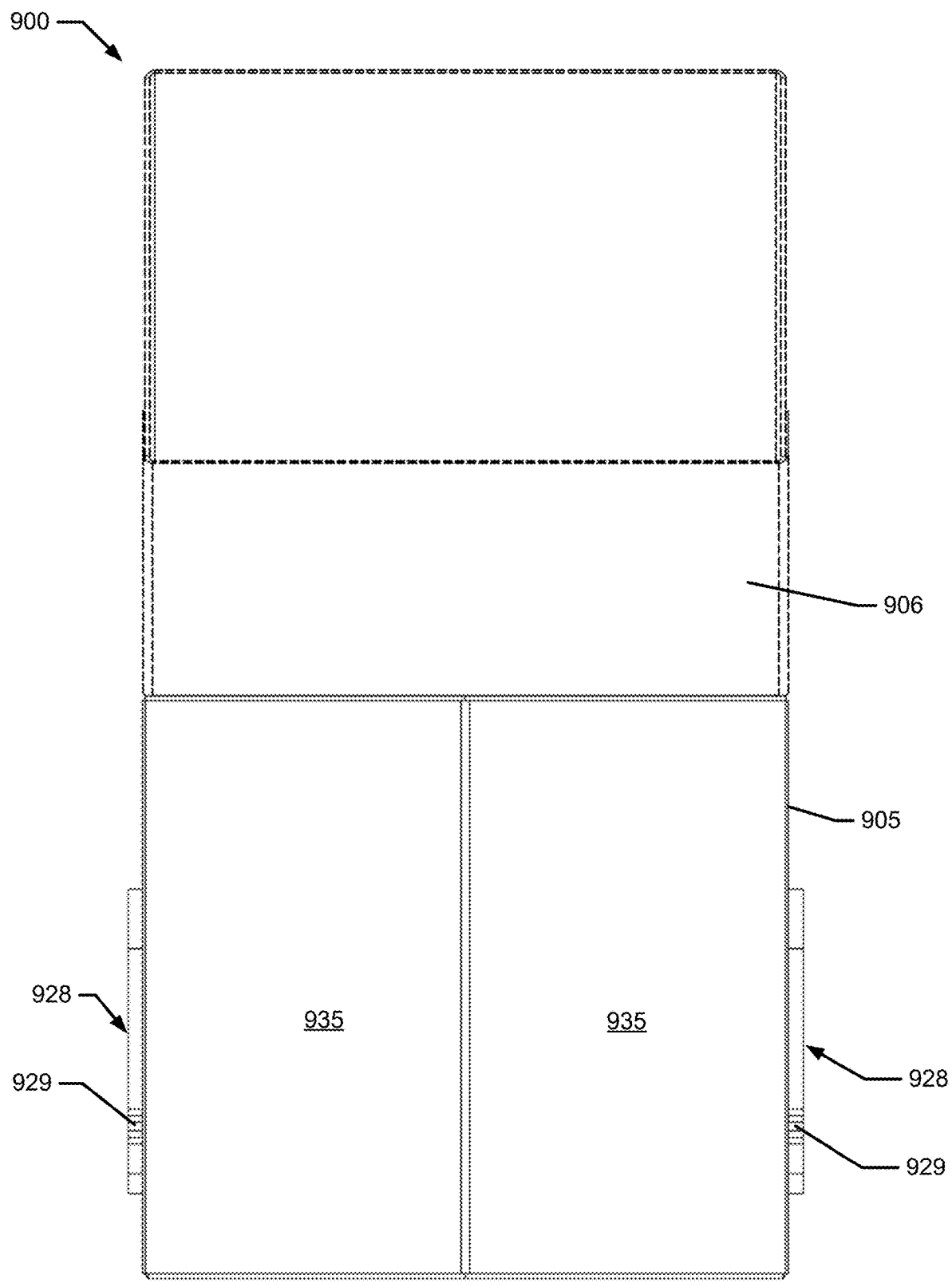
FIG. 9E is a top view of the feed trough adapter of FIG. 9A, in accordance with some embodiments.

FIG. 9E is a top view of the feed trough adapter of FIG. 9A, in accordance with some embodiments.

Figure 9F:
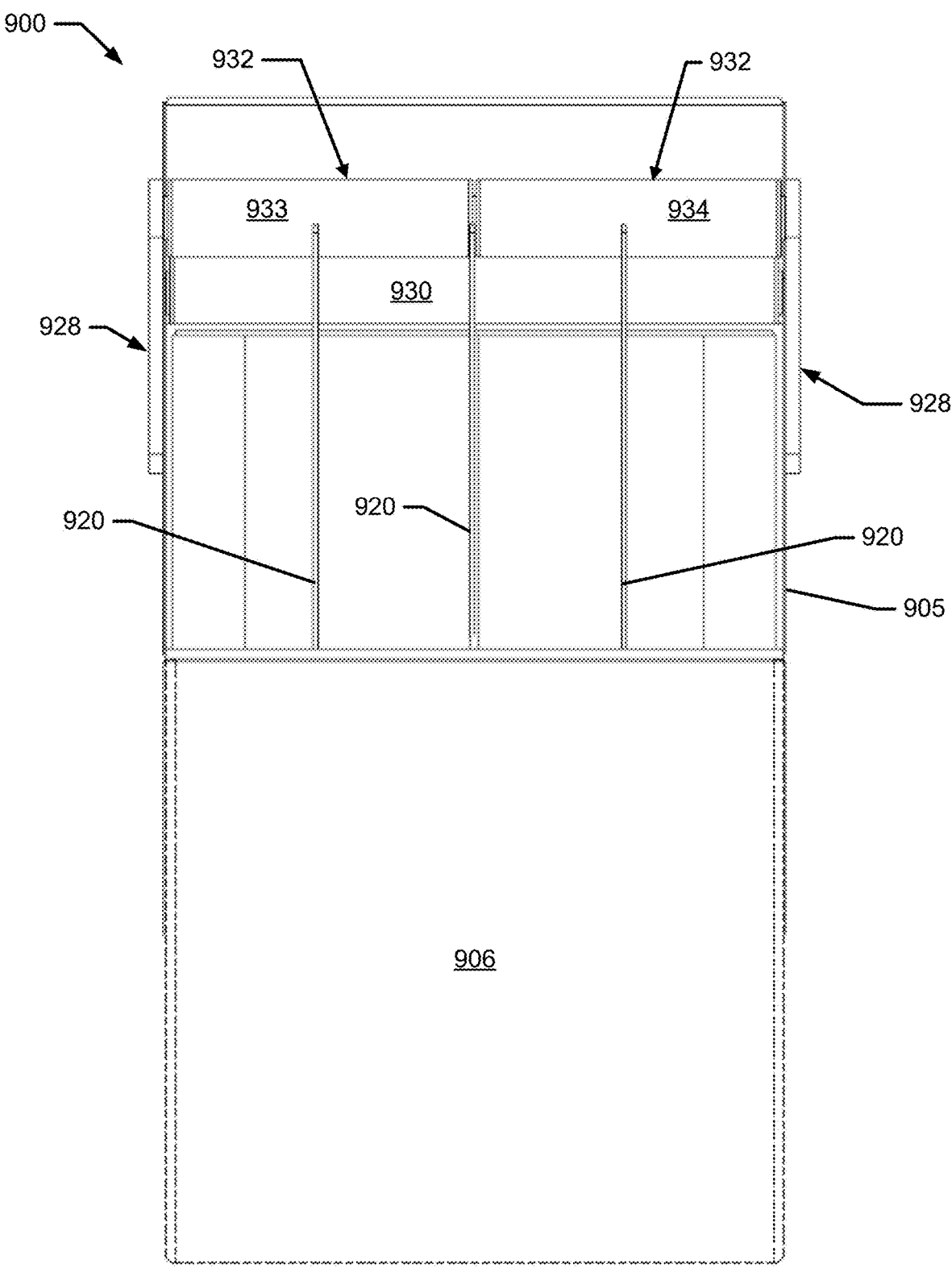
FIG. 9F is a bottom view of the feed trough adapter of FIG. 9A, in accordance with some embodiments.

FIG. 9F is a bottom view of the feed trough adapter of FIG. 9A, in accordance with some embodiments.

In some embodiments, the apparatus 900 for protecting feed accumulated in the feed troughs of the wildlife feeder comprises a body 905 having an adapter 906 configured to fit over the feed trough of a gravitationally fed, passive wildlife feeder and a plurality of pointed plates 920 configured to prevent unwanted wildlife from jumping onto the one or more feed troughs and reaching into the feed access opening 925 of the feed trough, and a first rotation member 930 and a second rotation member 932 rotatably supported to the body by arms 928 and configured to prevent unwanted wildlife from grabbing onto the one or more feed troughs to access the feed. Since the rotation members are permitted to rotate, unwanted wildlife, such as raccoons, will not be able to successfully grab onto the feed trough because as the wildlife reaches up, they will first contact the rotation members and their grip will just roll off. The adapter 906 can be made into any shape in order to couple onto any shaped design of an existing feed trough and does not form any part of the design of the feed trough adapter apparatus.

In some embodiments, the body further comprises a gabled cover member 935 that is attached to the top side of the body and configured to prevent unwanted wildlife from accessing the feed in the feed trough from above.

In some embodiments, the body 905 comprises a bottom plate 927 having an angle such that the edge of the bottom plate closest to the first rotation member is higher than the edge furthest from the first rotation member in order to prevent the feed from flowing through the feed access opening 925 and out of the body.

In some embodiments, the second rotation member 932 comprises two or more independently rotatable coaxial rollers, 933, 934. Independently rotatable coaxial rollers makes it more difficult for unwanted wildlife from grasping onto the feed trough.

In some embodiments, the body further comprises the bottom plate having one or more perforations which permit the drainage of fluids such as rain and wildlife saliva from the feed. Draining the fluids reduces the chances that the feed will rot.

In some embodiments, the body further comprises arms 928 having a saw tooth edge 929.

FIG. 10 is a block diagram illustrating a method for protecting feed accumulated in the feed troughs of a gravitationally fed, passive wildlife feeder, in accordance with some embodiments. FIG. 10 may be performed using the apparatuses described and illustrated in FIG. 3, FIG. 4, FIG. 5, FIG. 6, FIG. 7, FIG. 8, FIG. 9A, FIG. 9B, FIG. 9C, FIG. 9D, FIG. 9E, and FIG. 9F.

In one embodiment of the present invention, the method for protecting feed accumulated in the feed troughs of a gravitationally fed, passive wildlife feeder begins at block 1000, where an apparatus for protecting feed accumulated in the feed troughs of a gravitationally fed, passive wildlife feeder is provided, wherein the apparatus for protecting feed accumulated in the feed troughs of a gravitationally fed, passive wildlife feeder comprises a feed hopper, a plurality of supports coupled to the feed hopper, and one or more feed troughs coupled to the feed hopper and configured to receive a flow of feed from the hopper caused by gravity, wherein the supports are configured to position the one or more feed troughs at approximately the muzzle height of the desired wildlife to be fed and wherein each of the one or more feed troughs comprises a plurality of pointed plates configured to prevent unwanted wildlife from jumping onto the one or more feed troughs and reaching into the feed access opening of the feed trough, and a first rotation member and a second rotation member rotatably supported to the feed trough by arms and configured to prevent unwanted wildlife from grabbing onto the one or more feed troughs to access the feed. In some embodiments, the one or more feed troughs further comprise a gabled cover member that is attached to the top side of the feed troughs and configured to prevent unwanted wildlife from accessing the feed in the feed trough from above. In some embodiments, the one or more feed troughs further comprises a bottom plate having an angle such that the edge of the bottom plate closest to the first rotation member is higher than the edge furthest from the first rotation member in order to prevent the feed from flowing through the feed access opening and out of the feed trough. In some embodiments, the second rotation member comprises two or more independently rotatable coaxial rollers. In some embodiments, the apparatus for protecting feed accumulated in the feed troughs of the wildlife feeder further comprises a lid configured to cover the upper opening of the hopper in order to protect the feed within the apparatus from wildlife and the elements. In some embodiments, each of the one or more feed troughs further comprises a bottom plate having one or more perforations which permit the drainage of fluids such as rain and wildlife saliva from the feed. In some embodiments, the apparatus further comprises coverings surrounding each of the plurality of supports. The coverings comprise a material, such as PVC, with less friction than a painted or powder coated steel from which the rest of the apparatus may be constructed. In some embodiments, the apparatus further comprises arms, which support the first rotation member and second rotation member, having a saw tooth edge. Next, at block 1005, if the apparatus had not been loaded with feed, feed is dispensed into the hopper in order to fill the one or more feed troughs with feed. At block 1010, the apparatus is now ready to be used by intended wildlife for feeding. As the intended wildlife consume the feed in the feed trough, gravity will cause the feed within the hopper to flow into the feed trough to replenish the feed eaten by the intended wildlife. When the intended wildlife is not feeding from the apparatus, any unintended wildlife will no longer be able to feed from the trough as a result of the rotation members, plurality of pointed plates, gabled cover member, coverings, and/or saw tooth edge arms which protect the feed access opening from the unintended wildlife.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. An apparatus for protecting feed accumulated in feed troughs of a gravitationally fed, passive wildlife feeder comprising:
   a body, the body having an adapter configured to fit over a feed access opening of the gravitationally fed, passive wildlife feeder;
   a plurality of pointed plates coupled to the body;
   arms attached to the body; and
   a first rotation member and a second rotation member rotatably supported to the body by the arms, wherein the first rotation member and the second rotation member are positioned parallel to each other and coupled to the arms at different points;
   wherein the plurality of pointed plates are configured to prevent unwanted wildlife from jumping onto the apparatus, and
   wherein the first rotation member and the second rotation member are configured to prevent the unwanted wildlife from grabbing onto the apparatus to access the feed.

2. The apparatus of claim 1, further comprising a gabled cover member coupled to the body, wherein the gabled cover member is configured to prevent the unwanted wildlife from accessing the feed.

3. The apparatus of claim 1, wherein the body comprises a bottom plate angled to prevent the feed from flowing out of the body.

4. The apparatus of claim 1, wherein the second rotation member comprises two or more independently rotatable coaxial rollers.

5. The apparatus of claim 3, wherein the body further comprises the bottom plate having one or more perforations to permit drainage of fluids from the feed.

6. The apparatus of claim 1, wherein the arms comprise a saw tooth edge.

7. A gravitationally fed, passive wildlife feeder comprising:
   a feed hopper, the feed hopper configured to hold feed;
   a plurality of supports coupled to the feed hopper; and
   one or more feed troughs coupled to the feed hopper, wherein the one or more feed troughs are configured to receive the feed from the feed hopper;
   the one or more feed troughs comprising:
      a body;
      a plurality of pointed plates coupled to the body;
      arms attached to the body; and
      a first rotation member and a second rotation member rotatably supported to the body by the arms, wherein the first rotation member and the second rotation member are positioned parallel to each other and coupled to the arms at different points;
   wherein the plurality of supports are configured to position the one or more feed troughs at approximately a muzzle height of desired wildlife to be fed,
   wherein the plurality of pointed plates are configured to prevent unwanted wildlife from jumping onto the apparatus, and
   wherein the first rotation member and the second rotation member are configured to prevent the unwanted wildlife from grabbing onto the apparatus to access the feed.

8. The gravitationally fed, passive wildlife feeder of claim 7, further comprising a gabled cover member coupled to the body, wherein the gabled cover member is configured to prevent the unwanted wildlife from accessing the feed.

9. The gravitationally fed, passive wildlife feeder of claim 7, wherein the body comprises a bottom plate angled to prevent the feed from flowing out of the body.

10. The gravitationally fed, passive wildlife feeder of claim 7, wherein the second rotation member comprises two or more independently rotatable coaxial rollers.

11. The gravitationally fed, passive wildlife feeder of claim 9, wherein the body further comprises the bottom plate having one or more perforations to permit drainage of fluids from the feed.

12. The gravitationally fed, passive wildlife feeder of claim 7, wherein the arms comprise a saw tooth edge.

13. The gravitationally fed, passive wildlife feeder of claim 7, further comprising coverings surrounding the plurality of supports.

14. A method for protecting feed accumulated in feed troughs of a gravitationally fed, passive wildlife feeder, comprising:
   providing an apparatus comprising:
      a body, the body having an adapter configured to fit over a feed trough of the gravitationally fed, passive wildlife feeder;
      a plurality of pointed plates coupled to the body;
      arms attached to the body; and
      a first rotation member and a second rotation member rotatably supported to the body by the arms, wherein the first rotation member and the second rotation member are positioned parallel to each other and coupled to the arms at different points;
      wherein the plurality of pointed plates are configured to prevent unwanted wildlife from jumping onto the apparatus, and
      wherein the first rotation member and the second rotation member are configured to prevent the unwanted wildlife from grabbing onto the apparatus to access the feed; and
   if the apparatus has not been loaded with feed, then dispensing feed into the apparatus.

15. The method of claim 14, further comprising a gabled cover member coupled to the body, wherein the gabled cover member is configured to prevent the unwanted wildlife from accessing the feed.

16. The method of claim 14, wherein the body comprises a bottom plate angled to prevent the feed from flowing out of the body.

17. The method of claim 14, wherein the second rotation member comprises two or more independently rotatable coaxial rollers.

18. The method of claim 16, wherein the body further comprises the bottom plate having one or more perforations to permit drainage of fluids from the feed.

19. The method of claim 14, wherein the arms comprise a saw tooth edge.

* * * * *